2 Sheets—Sheet 1.

W. R. BRIGGS.

WOOD WORKING MACHINE.

No. 11,110. Reissued Sept. 16, 1890.

Witnesses
M. E. Fowler
W. F. Burkhart

Inventor
W. R. Briggs
by Edson Bros
Attorneys

THE NORRIS PETERS CO., PHOTO-LITHO., WASHINGTON, D. C.

W. R. BRIGGS.
WOOD WORKING MACHINE.
No. 11,110. Reissued Sept. 16, 1890.
Fig. 3.
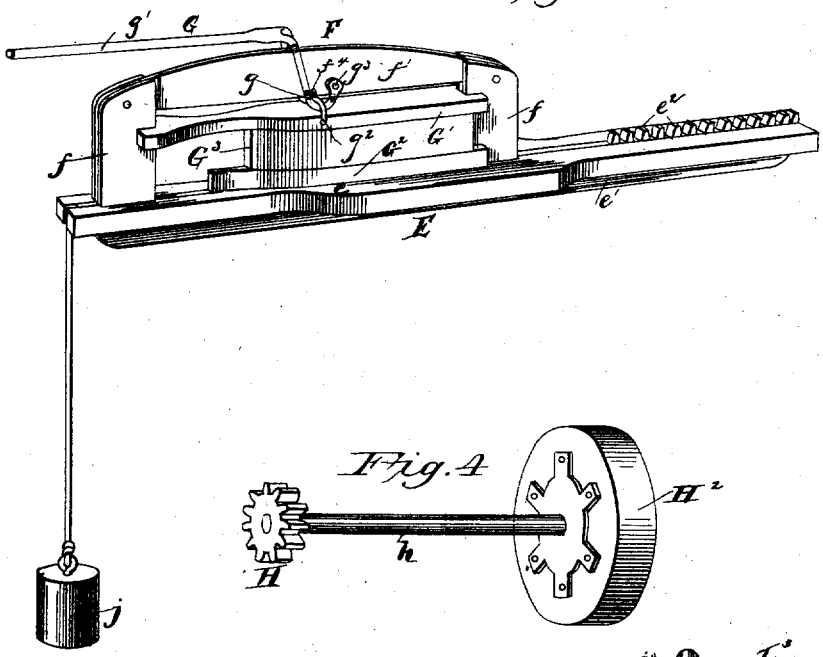
Fig. 4
Fig. 5.
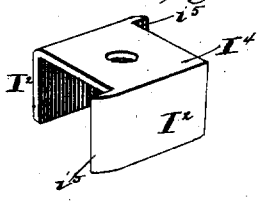
Fig. 6.
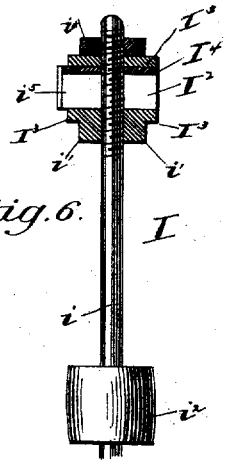
Witnesses
M. E. Fowler
W. Perukas
Inventor
W. R. Briggs
by Edson Bros
Attorneys
THE NORRIS PETERS CO., PHOTO-LITHO., WASHINGTON, D. C.

UNITED STATES PATENT OFFICE.

WARREN R. BRIGGS, OF EDGERTON, OHIO.

WOOD-WORKING MACHINE.

SPECIFICATION forming part of Reissued Letters Patent No. 11,110, dated September 16, 1890.

Original No. 360,138, dated March 29, 1887. Application for reissue filed September 21, 1887. Serial No. 250,343.

*To all whom it may concern:*

Be it known that I, WARREN R. BRIGGS, a citizen of the United States, residing at Edgerton, in the county of Williams and State of Ohio, have invented certain new and useful Improvements in Wood-Working Machines, of which the following is a specification, reference being had therein to the accompanying drawings.

My invention relates to wood-working machinery of that class wherein the wood is fed to rotary knives or cutters, and has for its object a provision of such a machine which shall be simple and durable in construction, easy of adjustment, and effective in operation; and to these ends the invention consists in a construction, combination, and arrangement of the several parts substantially as hereinafter fully set forth, and specifically pointed out in the claims.

The invention further consists in the provision of means whereby by the use of a suitable pattern the rotary knives or cutters automatically adjust themselves, so as to cut a body after a pattern of a desired configuration.

The invention is illustrated in the accompanying drawings, which form a part of this specification, and in which—

Figure 1:
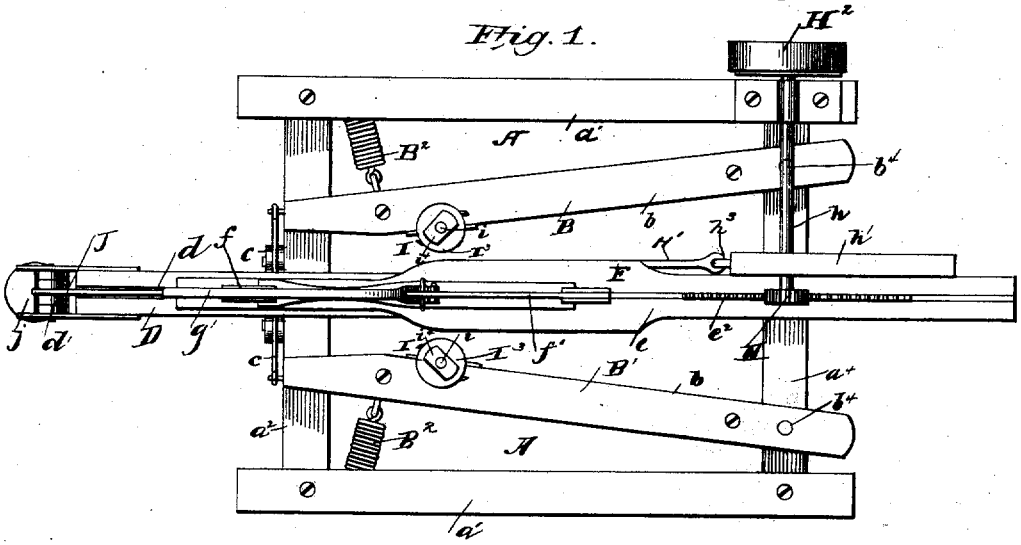
Figure 2:
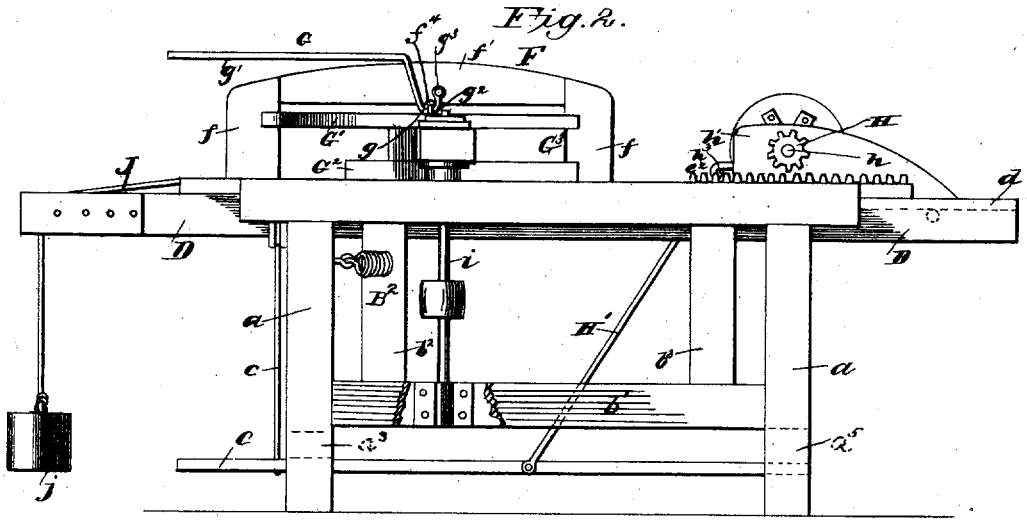

Figure 1 is a top plan view of my improved molding-machine. Fig. 2 is a side elevation thereof. Fig. 3 is an enlarged perspective view of the traveling carriage. Fig. 4 is a perspective view of the power-shaft provided with a driving-pulley at its outer end and a gear-wheel on its inner end. Fig. 5 is a detail perspective view of the knife or cutter detached, and Fig. 6 is a detail vertical sectional view through one of the cutters.

In the embodiment of my invention I employ a rigid oblong-shaped frame A, consisting, mainly, of four uprights $a$, connected by horizontal bars $a'$ on the sides, by bars $a^2$ $a^3$ at the forward end, and by bars $a^4$ $a^5$ at the rear end.

B B′ designate the movable or swinging cutter-supporting frames, consisting each of two bars $b$ $b'$, one above the other, and connected together by means of cross-bars $b^2$ $b^3$. These cutter-supporting frames are pivoted at their rear ends, as at $b^4$, to the transverse cross-bars $a^4$ $a^5$, and the bars $b^2$ of each frame are connected to the front uprights $a$ of the frame A by means of a spring $B^2$, preferably a coiled one, and as an offset to this spring tension the bars $b$ $b$ are connected at their front ends by means of a running cord $c$, passing over suitable pulleys to a foot-lever C, which is pivoted to the under side of the bar $a^5$. This lever is limited in its upward movement by the bar $a^3$, under which it operates.

D designates the carriage-support, disposed, preferably, in the longitudinal center of the machine, resting on and secured to the bar $a^4$, and this carriage-support is provided in its upper surface with a longitudinal slot or groove $d$. At the front end of the carriage-supporting frame is disposed in any suitable manner a roller $d'$, for the purpose to be hereinafter explained.

E designates the carriage, the base $e$ thereof having on its under side a downwardly-projecting longitudinal rib $e'$, which engages with the groove $d$ in the track or support D.

F designates a frame, consisting of side pieces $f$ $f$, a connecting-bar at top thereof, as $f'$, to which is pivoted, as at $g^3$, the lower inner end of a lever G, bent near its pivoted end downwardly to form an eccentric, as $g$, and thence bent upwardly, terminating in an arm $g'$. The lower part of this lever is connected at $g^2$ to a clamp G′, which is disposed parallel with the connecting-bar $f'$, and which is provided at each end with a recess adapted to receive the edge of the uprights $f$ $f$. This clamp is arranged above the pattern $G^2$, which rests upon and is secured to the base $e$ of the carriage to be carried thereby. The pattern $G^2$ is arranged between the end standards of the upright frame and in line with said standards, and the edges of said pattern have the contour or configuration which it is desired to impart to the work $G^3$. The edges of the sliding clamp are also shaped to conform to the contour of the pattern $G^2$, and against the edges of the clamp and pattern ride the disks at the upper and lower sides of the rotary cutter-heads I I. The wood or material $G^3$ is placed upon the pattern and clamped or held in place by the clamp G′. The clamp G′ is capable of a vertical sliding movement on the end standards $f$ of the frame of the endwise-movable work-carriage, when the lever G is moved on its pivot, in order that the work or material $G^3$ can be removed from and placed in position between the clamp and the pattern $G'$ $G^2$. The lower edge of the horizontal upper bar $f'$ of the frame F has a notch $f^4$ to receive the loop $g^2$, and thereby permit the sliding clamp $G'$ to move to the fullest extent permitted by the bar $f'$ without hinderance from the said loop. The base $e$ is provided near its rear end with rack $e^2$, which is fixed thereto, and with which engages to effect the movement of said carriage a gear-wheel H, hung on a shaft $h$, which is mounted in vertically-adjustable bearings $h'$, and again on the horizontal bar $a'$ of the frame A.

I designates the cutters for molding or forming the product or work held in the carriage, one of which is provided for each of the swinging frames. Each cutter has the blades or knives $I^2$, which are disposed in parallel vertical planes and connected together by an intermediate bridge-piece $I^4$, which is preferably made or formed integral with the cutters. The alternate vertical edges of the blades or knives $I^2$ are extended beyond the plane of the corresponding edge of the opposite blade, as at $i^5$, and these extended edges are beveled in the same horizontal plane, so that they will properly act on the work or product. The blades or knives of the cutter are fitted and clamped between flat horizontal disks $I^3$, which are fitted on the upper end of the shaft $i$ of the cutter, and these disks are rigidly and detachably secured or held on the shafts by suitable mechanism, my preferred form of which I will now describe. The upper end of the vertical shaft $i$ of each cutter is exteriorly screw-threaded, and the lower disk $I^3$ is provided with a base $i'$ of less diameter than the disk, and which is arranged on the under side of the same. This base $i'$ has a central threaded aperture, through which the threaded end of the shaft $i$ passes, and the said base and the lower disk $I^3$ are held against rotation on the shaft by the threads thereof engaging those of the base. The blades or knives bear on the lower disk $I^3$, and the upper disk is pressed against the blades to clamp the latter between the upper and lower disks by means of a nut $i^4$, which is screwed on the upper extremity of the shaft $i$. The shaft $i$ of each cutter has a belt-pulley $i^2$, over which passes a suitable belt to rotate the shaft to thereby drive the cutter, and each shaft is journaled in suitable bearings, which are rigidly affixed in the bars $b$ $b'$ of the swinging frames. The lower disk or base $i'$ of the cutter rests upon the upper bearing of the shaft, and it is of sufficient thickness to elevate the cutters above the plane of the upper edge of the pattern $G^2$ to properly act on the work and prevent cutting the said pattern. The cutting-edges of the blades are extended or projected beyond the peripheries of the disk $I^3$, and the lower disk of each cutter rides or bears against the pattern, so that the cutters are guided and controlled thereby. The bearings $h'$ of the driving-shaft $h$ is connected at $h^3$ to the foot-lever C by means of a suitable cord or strap or chain $H'$, whereby when the carriage E is to be moved forward the wheel H is brought into engagement with the gear-track $e^2$ by depressing the foot-lever.

J designates the cord or strap secured to the forward side pieces $f$ of the frame F, and thence runs over the pulley $d'$, and is provided at its ends with a weight $j$, the object of which is to draw the carriage back to its normal position after the gearing has been disconnected.

The operation of my device is as follows: The wood to be cut or shaped is placed between the clamp and pattern $G'$ $G^2$ while the lever C is elevated, after which it is lowered to bind the block firmly in position. During this operation the carriage is disposed at the forward end of the machine. The foot-lever C is then depressed, operating at the same time in a similar manner on the bearing $h'$ and gear-wheel H, as well as upon the sliding frames, the effect upon the latter being to bear the cutters against the block to be cut. The latter, it will be understood, rests, when in its normal position, at a point slightly above the rack. Power is then applied to the band-pulley $H^2$ on the shaft $h$, which rotates the gear-wheel H and draws the carriage E rearwardly at any desired speed. The lower disks $I^3$ of the cutters are pressed continually against the fixed pattern $G^2$ and follow the configuration of the same, while the rotary knives act upon the block to mold the same into a shape conforming to the configuration of the pattern. This result may be accomplished in any desired number of movements of the carriage, the cutters being prevented from cutting too deeply into the wood between the pattern and the sliding clamp by the lower disks $I^3$ of the cutters impinging or riding against the lateral faces or vertical edges of the pattern $G^2$, said disks $I^3$ being arranged in the same horizontal plane as the pattern, as shown. After the carriage has been fed or moved a sufficient distance to permit the cutters to operate upon the work throughout its entire length, the treadle is released to permit the swinging frames to be withdrawn from the carriage and the driving-shaft to be elevated, and thereby throw the gear-wheel thereon out of engagement with the rack on the carriage. When the gear-wheel is thus disengaged from the carriage, the weighted cord J draws the carriage forward, and thereby returns the carriage to its normal position.

I do not limit myself to the exact form and construction of the several parts herein shown and described as an embodiment of my invention, as it is obvious that changes and modifications may be made without departing from the spirit or sacrificing the advantages thereof.

What I claim, and desire to secure by Letters Patent, is—

1. In a wood-working machine, the combination of an endwise-movable carriage having the pattern and a clamp by which the work is held, the swinging frame arranged on opposite sides of the line of movement of the carriage and having the cutters, the springs connected with the said frames for normally holding the latter out of the path of the carriage, and a lever connected by intermediate devices with the swinging frames to simultaneously move the same in opposite directions, substantially as and for the purpose set forth.

2. In a wood-working machine, the combination of an endwise-movable carriage having the pattern, the swinging frames arranged on opposite sides of the line of movement of the said carriage and having the rotary cutters journaled therein, the springs connected to the frames near their free ends for normally holding the frames out of the path of the carriage, the guide-pulleys journaled on the frame of the machine, a swinging lever arranged out of the path of movement of the frames, and connections intermediate of the lever and the frames and passing over the pulleys, substantially as described.

3. In a wood-working machine, the combination of the swinging frames carrying the cutters, a sliding carriage adapted to travel between the said frames, a lever connected with the frames for moving the same in opposite directions simultaneously, the cutters carried by the frames, a movable bearing connected with the lever to be operated thereby simultaneously with the movement of the frames, and a driving-shaft mounted in the said bearing and adapted to be thrown into engagement with the carriage by the movement of the bearing simultaneously with the inward movement of the swinging frames toward the carriage, substantially as and for the purpose set forth.

4. In a wood-working machine, the combination of an endwise-moving carriage having the pattern and a fixed rack, the swinging frames carrying the cutters, a lever connected with the frames for simultaneously operating them, a pivoted bearing connected with the lever by an intermediate device to be elevated and depressed thereby, and a driving-shaft journaled in the said bearing and having a pinion adapted to be thrown into and released from gear with a rack on the said carriage and thereby actuate the latter, substantially as described, for the purpose set forth.

5. In a wood-working machine, a frame having a central longitudinal beam provided with a guide channel or groove, in combination with the sliding carriage working in the said channel or groove and carrying the pattern, the swinging pivoted frames arranged on opposite sides of the said carriage and having the cutters journaled therein, the springs connected with the swinging frames for normally holding the latter out of the path of the carriage, a lever connected with the frames for simultaneously moving the same, a pivoted bearing connected by an intermediate device with the lever, and a driving-shaft journaled in the bearing and adapted to be thrown into gear with the carriage when said bearing is moved on its pivot by the lever, substantially as and for the purpose set forth.

6. In a wood-working machine, the combination of a table or frame having the guide-pulley $d'$, a sliding carriage carrying a pattern and a fixed rack, the movable frames disposed on opposite sides of the line of movement of the carriage and provided with the cutters, the lever arranged out of the path of the frame and connected with the same, the movable bearing connected with the lever, a driving-shaft journaled in the bearing and having a gear-wheel adapted to be thrown into gear with the rack on the carriage, and a weighted cord passing over the pulley $d'$ and connected with the carriage for returning the same to its normal position when the driving-shaft is thrown out of gear with the carriage, substantially as and for the purpose set forth.

7. In a wood-working machine, a sliding carriage having the fixed frame provided with the end standards, a fixed pattern on the said carriage arranged between the end standards, a sliding clamp arranged above the pattern and connected with the end standards to be guided thereby, and a lever pivoted to the frame and loosely connected to the clamp to operate the same, substantially as described, for the purpose set forth.

8. In a wood-working machine, a traveling carriage limited to endwise movement between the cutters and carrying a single fixed pattern having the lateral faces thereof shaped to the desired configuration, and a movable clamp for holding the work between itself and the pattern, in combination with two movable frames, each carrying a cutter arranged in substantially the same horizontal plane as the pattern to be controlled by the same in relation to the work, mechanism, substantially as described, for normally holding the frames away from the carriage, and a single lever arranged out of the path of the frames and connected with both frames to move the same in opposite directions, as and for the purpose described.

9. In a wood-working machine, substantially as described, the combination of the movable frames, the endwise-movable carriage limited to movement in a direct line between said frames, an upright frame secured to the carriage, the pattern fixed to the base of the carriage and arranged between and substantially in line with the standards of said upright frame, the horizontal vertically-sliding clamp guided at its ends by the standards of the upright frame and arranged above the pattern to clamp the work between itself and the pattern, a lever fulcrumed in the upright frame for adjusting the clamp vertically, and the rotary cutters journaled in the movable frames, substantially as described, for the purpose set forth.

10. In a wood-working machine, substantially as described, the combination of the movable frames, the endwise-movable carriage having the upright frame secured to the base thereof, the pattern fixed to the base of the carriage between and in line with the standards on the upright frame, the horizontal vertically-sliding clamp connected at its ends to the upright standards of the frame to be guided by said standards and arranged above the pattern to clamp the work throughout the length of the same between said pattern and the clamp, the edges of the pattern and clamp being of corresponding configuration or contour, a lever fulcrumed on the frame for operating the clamp, and the rotary cutters carried by the movable frames, all arranged and combined substantially as and for the purpose described.

11. In a wood-working machine, substantially as described, the combination of the movable frames, the endwise-movable carriage having the upright frame fixed to the base thereof, the pattern fixed to the base of said carriage and arranged between and in line with the standards of said upright frame, the horizontal vertically-sliding clamp having its ends connected to the standards of said upright frame and arranged above the pattern, the edges of the clamp and pattern being of corresponding contour, a lever fulcrumed on the frame for operating the clamp, the rotary cutters journaled in the movable frames, each cutter comprising the cutter-blades, and the clamping-disks arranged above and below said cutter-blade, as and for the purpose described.

In testimony whereof I have fixed my signature in presence of two witnesses.

WARREN R. BRIGGS.

Witnesses:

R. L. STARR,

EMERY LATTAMER.